United States Patent [19]
Sako et al.

[11] Patent Number: 5,644,480
[45] Date of Patent: Jul. 1, 1997

[54] POWER SOURCE DEVICE

[75] Inventors: Hiroyuki Sako; Tokushi Yamauchi, both of Kadoma, Japan

[73] Assignee: Matsushita Electric Works, Ltd., Osaka, Japan

[21] Appl. No.: 235,346

[22] Filed: Apr. 29, 1994

[30] Foreign Application Priority Data

Nov. 15, 1993 [JP] Japan .................................. 5-285309
Nov. 25, 1993 [JP] Japan .................................. 5-295030

[51] Int. Cl.$^6$ ................................................. H02M 3/338
[52] U.S. Cl. .................................................. 363/17; 363/98
[58] Field of Search ............................ 363/17, 97, 98, 363/40, 41

[56] References Cited

U.S. PATENT DOCUMENTS 4,212,053 7/1980 Sichenzia ............................ 363/39
5,381,327 1/1995 Yan .................................... 363/24
5,434,480 7/1995 Bobel ................................. 315/224

Primary Examiner—Peter S. Wong
Assistant Examiner—Derek J. Jardieu
Attorney, Agent, or Firm—Leydig, Voit & Mayer

[57] ABSTRACT

A power source device for supplying a high frequency AC voltage to a load. An source voltage is changed by a rectifier into a into a DC voltage that is supplied to an inverter to produce the high frequency AC voltage. The high frequency AC voltage is fed back to the rectifier where a resonant circuit resonates with the high frequency AC voltage. The inverter may be self-excited through feedback of the high frequency AC voltage. In this power source device, any pausing in the AC source voltage is filled in through the feedback and resonant circuits.

21 Claims, 13 Drawing Sheets

POWER SOURCE DEVICE

BACKGROUND OF THE INVENTION

This invention relates to a power source device which rectifies and smooths an AC voltage supplied from an AC source into a DC voltage, which voltage is converted at an inverter into a high frequency AC voltage for driving a load; and, more particularly, to the power source device which can improve the power factor and eliminate higher harmonic distortion in input current from the AC source.

DESCRIPTION OF RELATED ART

For the known power source device of the kind referred to, there has been one disclosed in, for example, Japanese Patent Laid-Open Publication No. 5-9918, in which device an AC voltage supplied from an AC source through a high-frequency cutting inductor is full-wave rectified at a diode bridge DB and smoothed at a smoothing capacitor as fed through an inductor as a high-frequency cutting filter, and a DC voltage is supplied to an inverter circuit. An output high frequency AC voltage of this inverter circuit is supplied through an output transformer T to a discharge lamp as a load, while this high frequency AC voltage of the inverter circuit is made to feedback by a feedback winding n through a capacitor as a low-frequency cutting filter to an input side of the diode bridge. Further, the smoothing capacitor is charged through an inductor by an output voltage of the diode bridge on which the high frequency AC voltage of the inverter circuit is superposed, to thereby enable it possible to supply an input current substantially over the whole range of each cycle of the AC voltage from the AC source, so that it is made possible to improve the input power factor from the AC source and to eliminate the higher harmonic distortion in the input current. Since the thus improved device can be realized by a relatively simple circuit arrangement, it is also made possible to restrain any increase in manufacturing costs.

Another example of the known power source device has been disclosed in U.S. Pat. No. 4,642,745, in which device a feedback winding and an LC resonance circuit are connected in series with an output end of a rectifying element, so that the LC resonance circuit will be operated by a high frequency voltage of the feedback winding so as to eliminate the input current distortion, and an input current involving no pausing period of input supply can be obtained.

In the foregoing device of Japanese Patent Laid-Open Publication 5-9918, however, there is a problem that the so-called pausing period in which the input current does not flow occurs when the AC voltage of the AC source is close to zero. Further, since the high frequency AC voltage of the inverter circuit is made to feedback through the feedback winding to the AC source side, a supplied energy from the output transformer is made to decrease by the feedback amount of the voltage through the feedback winding, and there arises another problem that a lamp current to the discharge lamp involves a ripple caused to occur in synchronizm with the cycle of the AC voltage from the AC source.

In the device of U.S. Pat. No. 4,642,745, on the other hand, it is possible to eliminate the pausing period of the input current to enable it possible to flow the input current over the whole range in every cycle of the AC voltage, whereas the device is made to apply to a diode element which receiving the source voltage a voltage twice as large as the source voltage in realizing the input current supply having no pausing period at valley portions of the respective cycles of the AC voltage, for example, whereby there arises a problem that a loss at the diode element increases or a noise is caused to occur upon switching operation of this diode element.

As a further measure for eliminating the foregoing problems, there has been suggested in, for example, U.S. Pat. No. 4,952,849, a power source device in which a DC-DC converter called as an active filter circuit is employed so as to execute a restriction of any application of overvoltage or any noise occurrence upon switching operation. In the case where the active filter circuit is used, there arises another problem that the device has to become complicated in the entire circuit arrangement to have manufacturing costs increased.

SUMMARY OF THE INVENTION

Accordingly, a primary object of the present invention is to provide a power source device which has overcome the foregoing problems, and is capable of improving the input power factor, eliminating the higher harmonic distortion, removing any pausing period of the input current, and simplifying the circuit arrangement.

According to the present invention, this object can be realized by a power source device in which an AC voltage supplied from an AC source is rectified by a rectifying means, an output voltage of the rectifying means is smoothed by a smoothing capacitor, and an output DC voltage of this smoothing capacitor is converted by an inverter into a high frequency AC voltage which is supplied to a load, wherein the output high frequency AC voltage from the inverter is made by a voltage feedback means to feedback to an input side of the rectifying means, and an LC resonance circuit is provided for resonation with respect to the feedback high frequency voltage.

Other objects and advantages of the present invention shall become clear from following description of the present invention detailed with references to various embodiments of the invention in conjunction with accompanying drawings.

While the present invention shall now be described as detailed with reference to the respective embodiments shown in the accompanying drawings, it will be appreciated that the intention is not to limit the present invention only to these embodiments shown but rather to include all alterations, modifications and equivalent arrangements possible within the scope of appended claims.

DETAILED DESCRIPTION OF THE PREFERRED EMBODIMENTS

Figure 1:
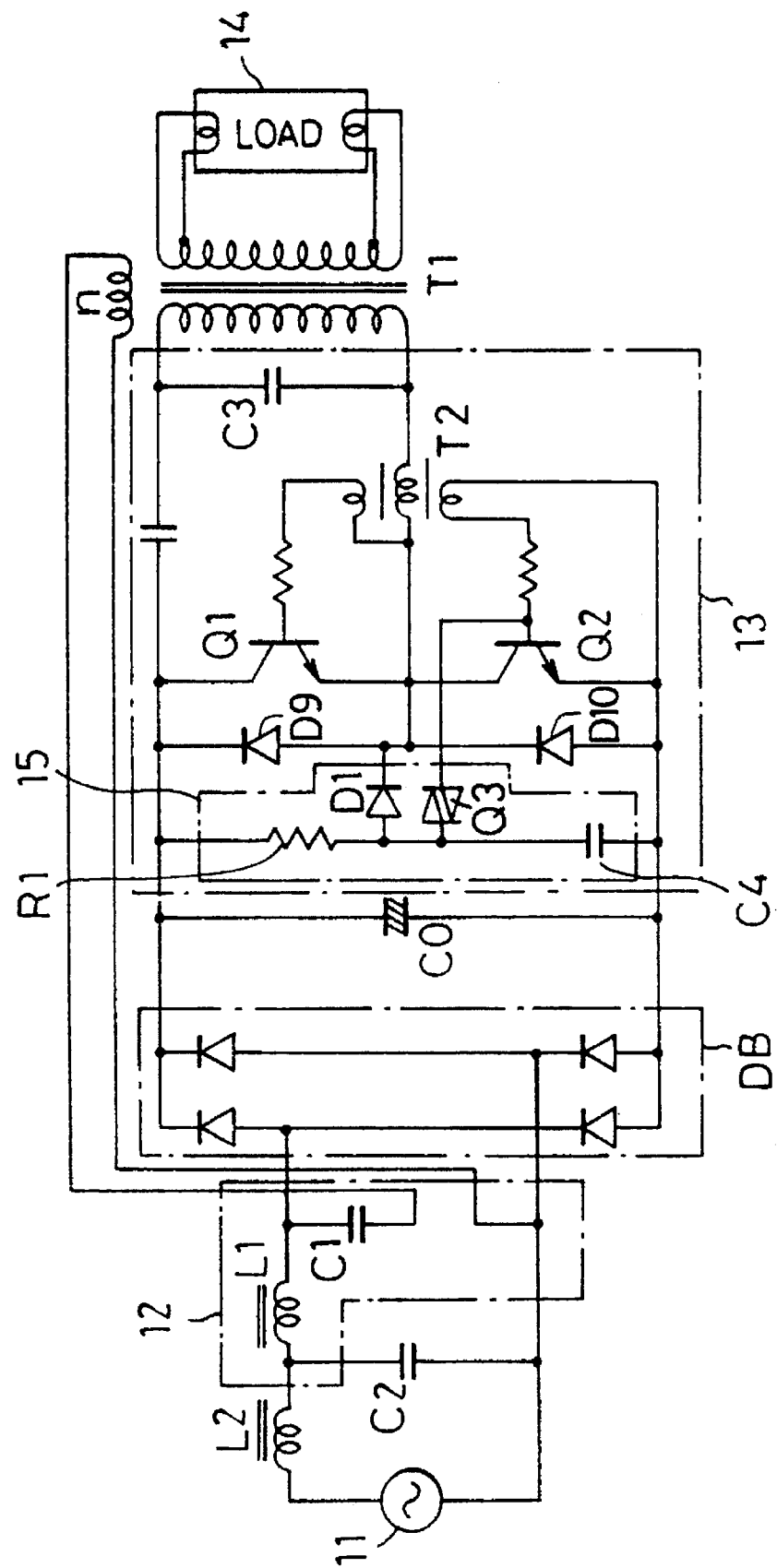
FIG. 1 is a circuit diagram of the power source device in an embodiment according to the present invention.

Referring to FIG. 1, there is shown a circuit diagram of the power source device in an embodiment according to the present invention, which comprises an AC source 11, a resonance circuit 12 including an inductor L1 and a capacitor C1, a rectifying means formed by a diode bridge DB, a smoothing capacitor C0, an inverter circuit 13, and output transformer T1, and a feedback winding n for causing a high frequency AC voltage in the inverter circuit 13 to feedback through the output transformer T1 to the resonance circuit 12, while a discharge lamp 14 is connected as a load to secondary side of the output transformer T1 and a high-frequency filter is formed by an inductor L2 and capacitor C2 connected to the AC source 11.

The feedback winding n is connected on its output side in series to the capacitor C1 in the resonance circuit 12, and this series circuit of the capacitor C1 and feedback winding n is connected to the AC source 11 in parallel with the diode bridge DB. Here, an AC voltage from the AC source 11 is subjected to a full-wave rectification at the diode bridge DB, further smoothed by the smoothing capacitor C0, and input into the inverter circuit 13.

The inverter circuit 13 includes switching transistors Q1 and Q2 connected in series and a pair of diodes D9 and D10 connected in series. The smoothing capacitor C0 is connected in parallel with the series-connected switching transistors Q1 and Q2 and in parallel with the series-connected diodes D9 and D10. The pair of switching transistors Q1 and Q2 in series connection are alternately conducting and non-conducting so that a high frequency AC voltage is obtained from a DC voltage input through the smoothing capacitor C0, which high frequency AC voltage is caused to resonate in a resonance circuit of a voltage feedback transformer T2 and capacitor C3 and is supplied through the output transformer T1 to the discharge lamp 14, whereby this discharge lamp 14 can be started and lighted. The switching operation of the switching transistors Q1 and Q2 is carried out by means of a self-excitation of the voltage feedback transformer T2 connected at secondary winding to respective bases of the switching transistors Q1 and Q2. A starting circuit 15, i.e., self-excitation means, for starting the inverter circuit 13 is connected in parallel to the switching transistors Q1 and Q2, and this starting circuit 15 comprises a coupling capacitor C4 and a resistor R1 connected in series. The series-connected capacitor C4 and resistor R1 are connected in parallel with the diode bridge DB. The starting circuit also includes a diode D1 connected between the junction of the capacitor C4 and the resistor R1 and the junction of the switching transistors Q1 and Q2. A DIAC Q3 is connected between the junction of the capacitor C4 and the resistor R1 and the control terminal of the second switching transistor Q2.

Here, a resonance frequency $f_0$ of the resonance circuit 12 is represented by a following formula, with an inductance of the inductor L1 represented by $L_1$ and a capacity of the capacitor C1 represented by $C_1$, $$f_0 = \frac{1}{2} \pi \sqrt{L_1 C_1}$$

whereby the inductance of the inductor L1 and capacity of the capacitor C1 are optimumly set so that the resonance frequency $f_0$ will be substantially equal to the frequency $\underline{f}$ of the output high frequency AC voltage of the inverter circuit 13.

Figure 2:
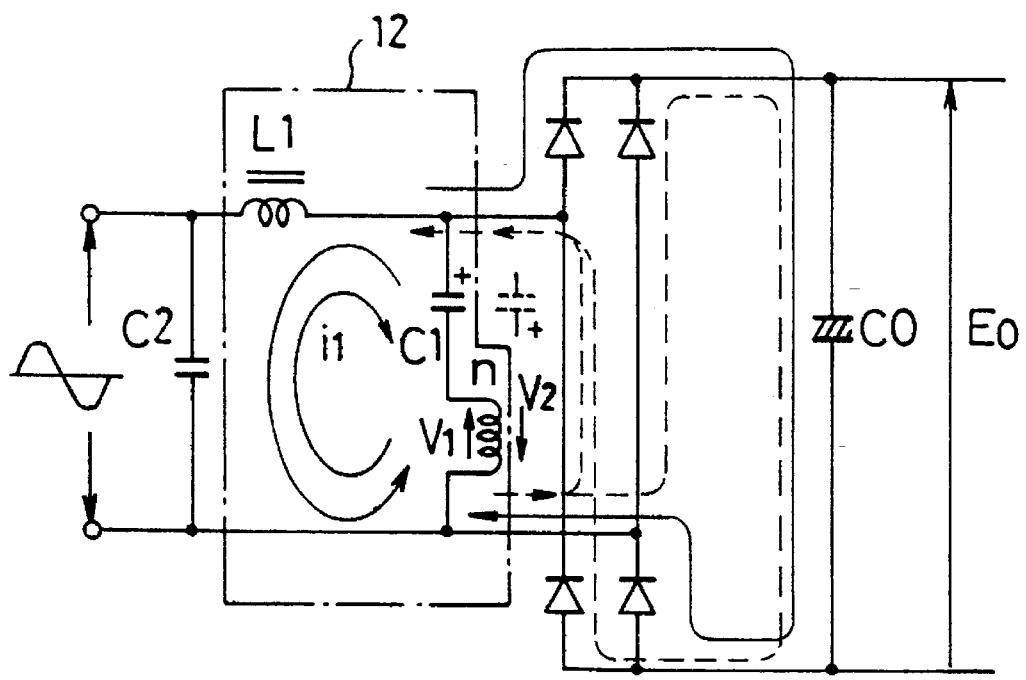
FIG. 2 is an explanatory view for an operation of the power source/device shown in FIG. 1.

Referring now to the operation of the power source device of FIG. 1 with concurrent reference to FIG. 2, the AC voltage of the AC source 11 in respective positive half cycles causes the high frequency AC voltage in accordance with an operating frequency of the inverter circuit 13 to be generated in the feedback winding n connected to the resonance circuit 12, to be alternately in opposite direction of $v_1$ and $v_2$ as shown in FIG. 2. Since the frequency $\underline{f}$ of the high frequency AC voltage generated in the feedback winding n and the resonance frequency $f_0$ of the resonance circuit 12 are so set as to be substantially equal to each other, there is caused a resonance current $i_1$ to flow in the resonance circuit 12 by the high frequency AC voltage induced in the feedback winding n. Accordingly, a high frequency AC voltage is caused to be generated across the capacitor C1, which with the high frequency AC voltage in the feedback winding n are superposed on the AC voltage of the AC source 11 (see FIG. 3A). Thus, the superposed voltage is full-wave rectified at the diode bridge DB to charge the smoothing condenser C0.

Figure 3A:
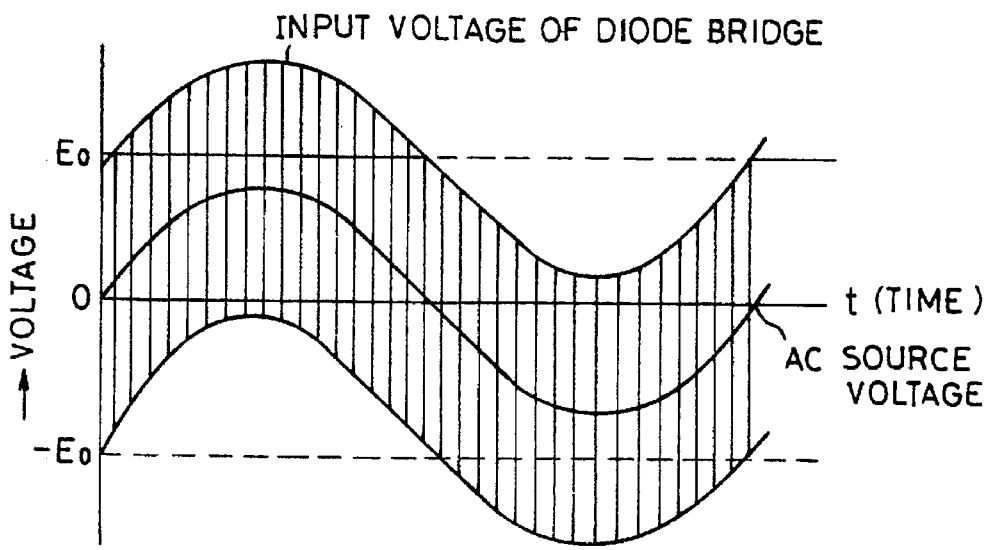
FIG. 3A is a waveform graph of an input voltage to the rectifying means in the device of FIG. 1.
Figure 3B:
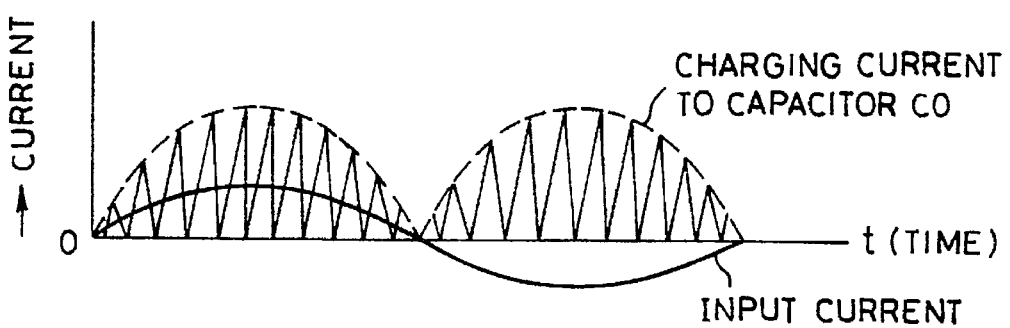
FIG. 3B is a waveform graph showing a charge current to the smoothing capacitor in the device of FIG. 1.
Figure 4:
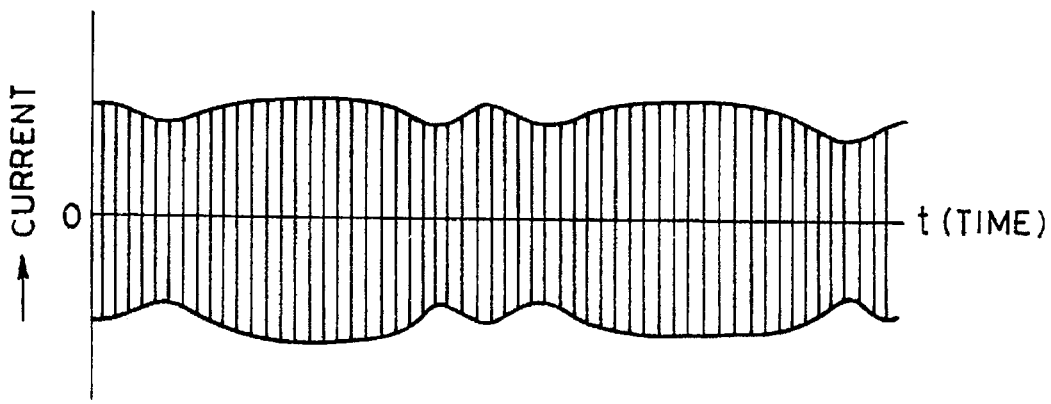
FIG. 4 is a waveform graph showing a lamp current in the device of FIG. 1.
Figure 5:
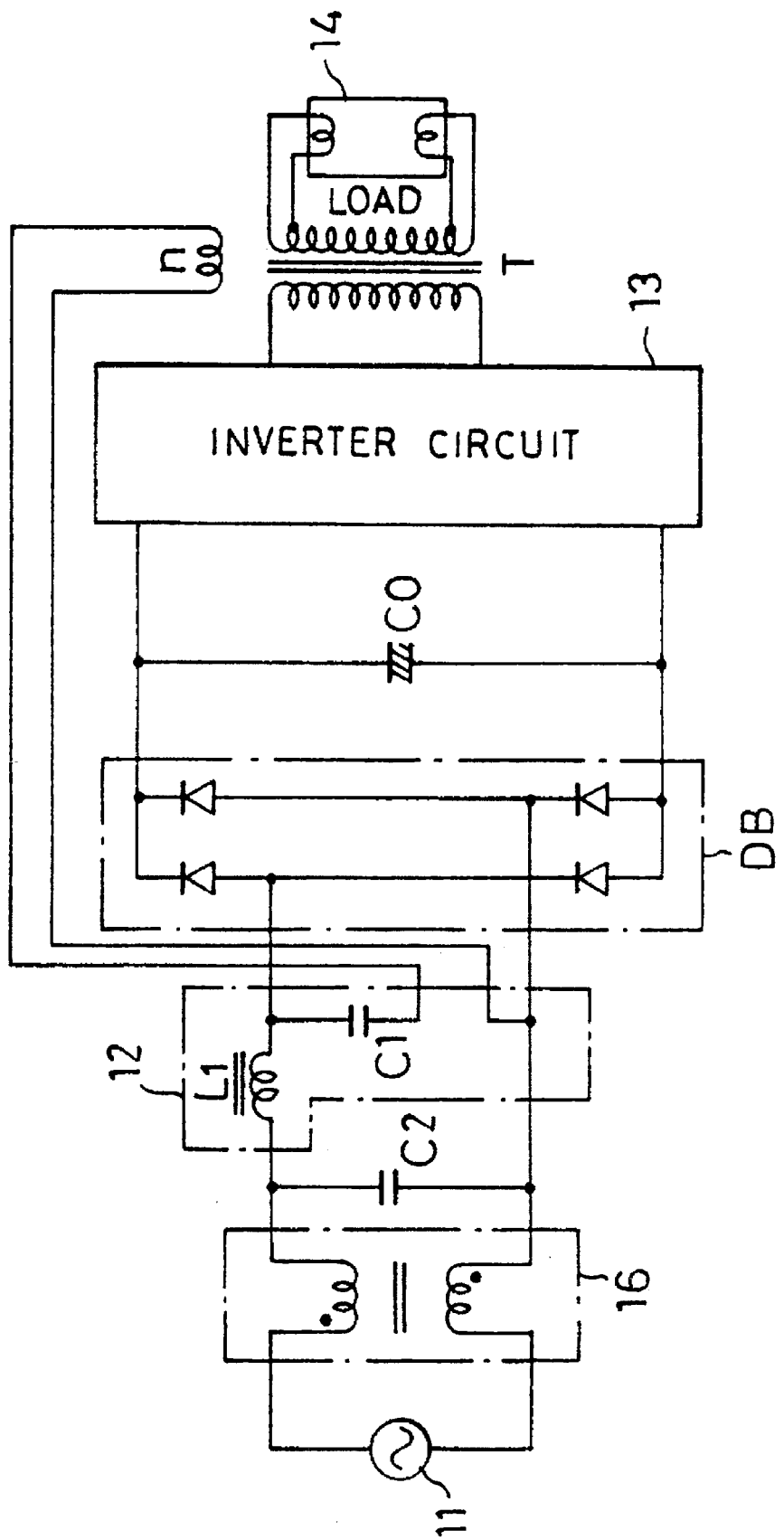
FIG. 5 a circuit diagram of the power source device in another embodiment according to the present invention.

That is, as will be clear from FIG. 3A, the AC voltage of the AC source 11 on which the voltage of the capacitor C1 and the high frequency AC voltage generated in the feedback winding n are superposed becomes higher than voltage $E_0$ of the smoothing capacitor C0 substantially over the whole period of each cycle of the AC voltage, and a charge current is made to flow through the smoothing capacitor C0 as a chopping current over the whole period (see FIG. 3B). At this time, there is caused to flow to the discharge lamp 14 as the load such lamp current showing excellent waveform and a low ripple as shown in FIG. 4. This is caused by an automatic change of an oscillation frequency of the inverter circuit 13 at peak and valley portions of the AC voltage. As in the present instance the high frequency output voltage is fed back from the output transformer, ripples of the AC source cycle ride on a primary windings of the transformer, the resonance current of the resonance circuit in the inverter circuit 13 is changed in frequency at the peak and valley portions, so that driving signals for the switching elements in the inverter circuit 13 also automatically change, and consequently the oscillating frequency of the inverter circuit 13 varies, whereby the lamp current is made almost not to decrease even when the AC voltage of the AC source 11 is close to zero, and an excellent light output can be obtained. Since in the present invention the device adopts the self-excitation circuit, any ripple can be automatically reduced by the above operation, but an external-excitation circuit may also be adopted, in which event the reduction of ripple can be easily realized through a modulation control or the like. As shown in FIG. 5, it is possible to attain further improved restriction of the higher harmonic distortion of the input current supplied from the AC source 11 by connecting, instead of the high-frequency blocking inductor L2, a passive filter 16 made by winding two wires on a common core.

When the load is the discharge lamp, the frequency of the high frequency AC voltage of the inverter circuit 13 is raised higher than the frequency in ordinary lighting mode, in the case where the device is in a dimming lighting mode with light output from the discharge lamp or in a preheating mode of filaments immediately after starting of current supply to the discharge lamp 14. Thus, by setting the inductance $L_1$ of the inductor L1 and the capacitance $C_1$ of the capacitor C1 so that the resonance frequency $f_0$ of the resonance circuit 12 will be higher than the frequency $\underline{f}$ of the high frequency AC voltage of the inverter circuit 13 in the ordinary lighting mode, the frequency of the high frequency AC voltage of the inverter circuit 13 which rises upon lighting of the discharge lamp in such modes will become closer to the set resonance frequency $f_0$ of the resonance circuit 12, and the higher harmonic distortion of the input current can be improved to a predetermined level even in the foregoing modes.

Further, when the inductance $L_1$ of the inductor L1 and the capacitance $C_1$ of the capacitor C1 are so set that the resonance frequency $f_0$ of the resonance circuit 12 will be lower than the frequency $\underline{f}$ of the high frequency AC voltage of the inverter circuit 13 in the ordinary lighting mode, the frequency $\underline{f}$ of high frequency AC voltage of the inverter circuit 13 falls. Where the frequency is to be lower than that in the ordinary lighting mode in an event where the optical output is required to be increased more than that in ordinary lighting state the frequency will approach the set resonance frequency $f_0$ of the resonance circuit 12, and the higher harmonic distortion of the input current can be improved to a predetermined level even in the failing mode of the oscillation frequency.

Further, by providing an adjusting means for adjusting at least one of the inductance $L_1$ of the inductor L1 and the capacitance $C_1$ of the capacitor C1 to vary the resonance frequency $f_0$ of the resonance circuit 12, and adjusting the resonance frequency $f_0$ of the resonance circuit 12 with this adjusting means in accordance with the frequency $\underline{f}$ of the high frequency AC voltage of the inverter circuit 13, which varies in response to various operating states of the inverter circuit 13 to render the frequency $f_0$ to approach the frequency $\underline{f}$ of the high frequency AC voltage, it is possible to improve the higher harmonic distortion of the input current to be at a predetermined level in every operating state of the inverter circuit 13.

While in the foregoing embodiment the load 14 has been referred to as being the discharge lamp, the invention is not to be so limited. The inverter circuit 13 is also not to be limited only to the type referred to but such other type circuit as a single stage type, L-push-pull type, and so on, can be effectively employed.

Figure 6:
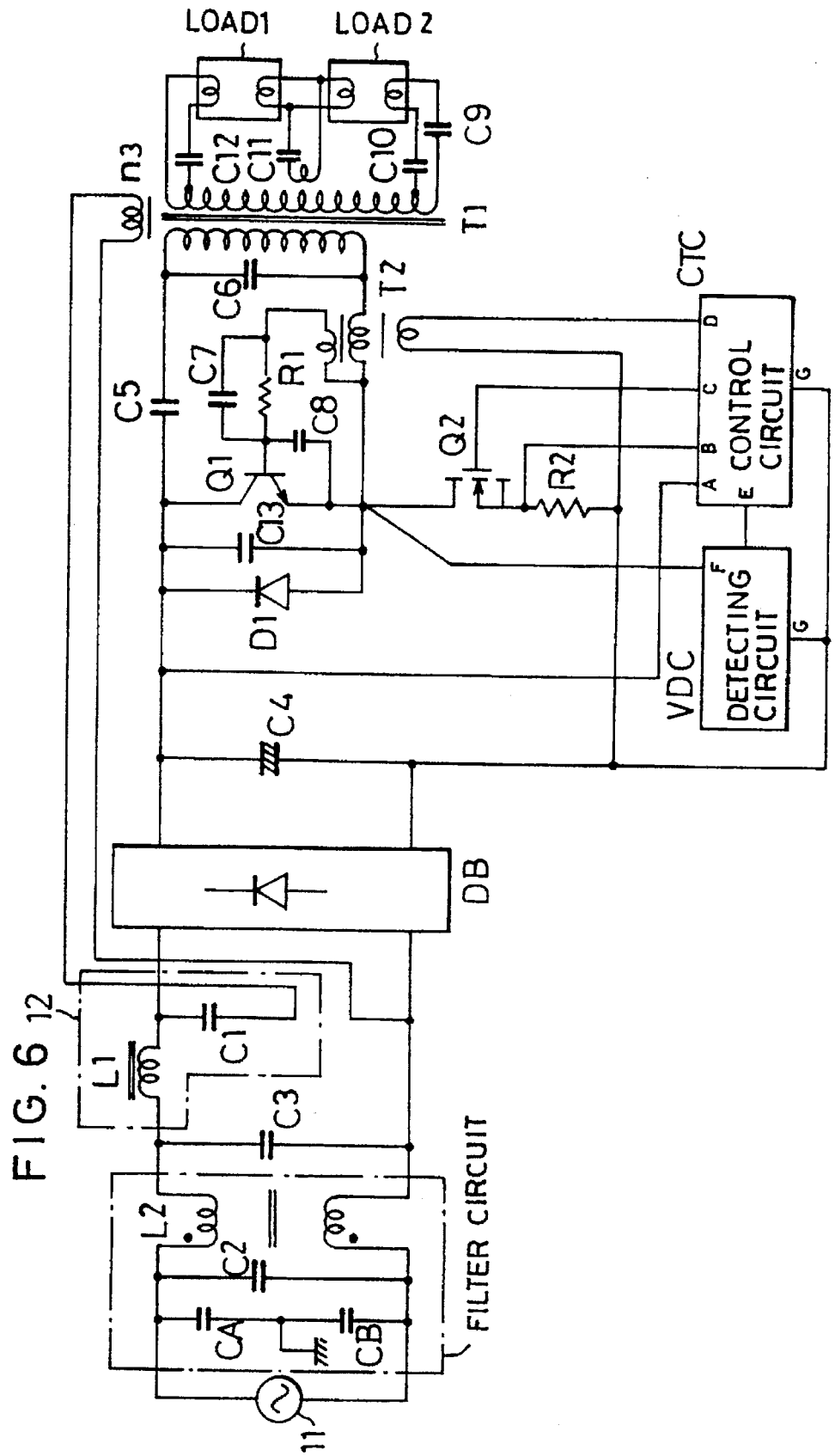
FIG. 6 is a circuit diagram of the power source device in another embodiment according to the present invention.

In FIG. 6, there is shown another embodiment of the power source device according to the present invention, in which the filter circuit further includes capacitors CA and CB connected in parallel to the capacitor C2. Further, a detecting circuit VDC is connected to the inverter circuit, so that a potential at an intermediate point between the switching transistors Q1 and Q2 (optimumly, a MOSFET is used as Q2 here) can be detected by this detecting circuit VDC, a detection signal of which is input to a drive control circuit CTC at a next stage. At this drive control circuit CTC, various input signals are received at terminals A, B, D and E, in response to which a sequential rectangular wave signal is provided at a terminal C for controlling ON and OFF operation of the switching transistor Q2. Two of loads LOAD1 and LOAD2, for example, the discharge lamps, or even more than three of them as occasion demands are connected for enabling series lighting. In this case, capacitors C10, C11 and C12 for preventing short-circuit are inserted in respective filament connections, for preventing any short-circuiting occurring in filament preheating windings of the respective discharge lamps. In the load circuit, a further capacitor C9 is connected for blocking DC signal components from the load circuit.

Further, in the inverter circuit, a capacitor C13 functioning as a snubber is inserted, and a resonance capacitor C6 is connected to the primary winding T2 of the resonance transformer. Controlling capacitors C7 and C8 are connected to the switching transistor Q1 while a current detecting resistor R2 is connected to the other switching transistor Q2.

While the power source device shown in FIG. 6 does not involve any substantial change in basic arrangement of the inverter circuit from the foregoing embodiment of FIG. 1, it will be appreciated that the switching transistor Q2 in the present embodiment can be ON/OFF controlled by the drive control circuit CTC to be arranged for external excitation control, in contrast to the self-excitation control of the switching transistor Q2 in the embodiment of FIG. 1.

Figure 7:
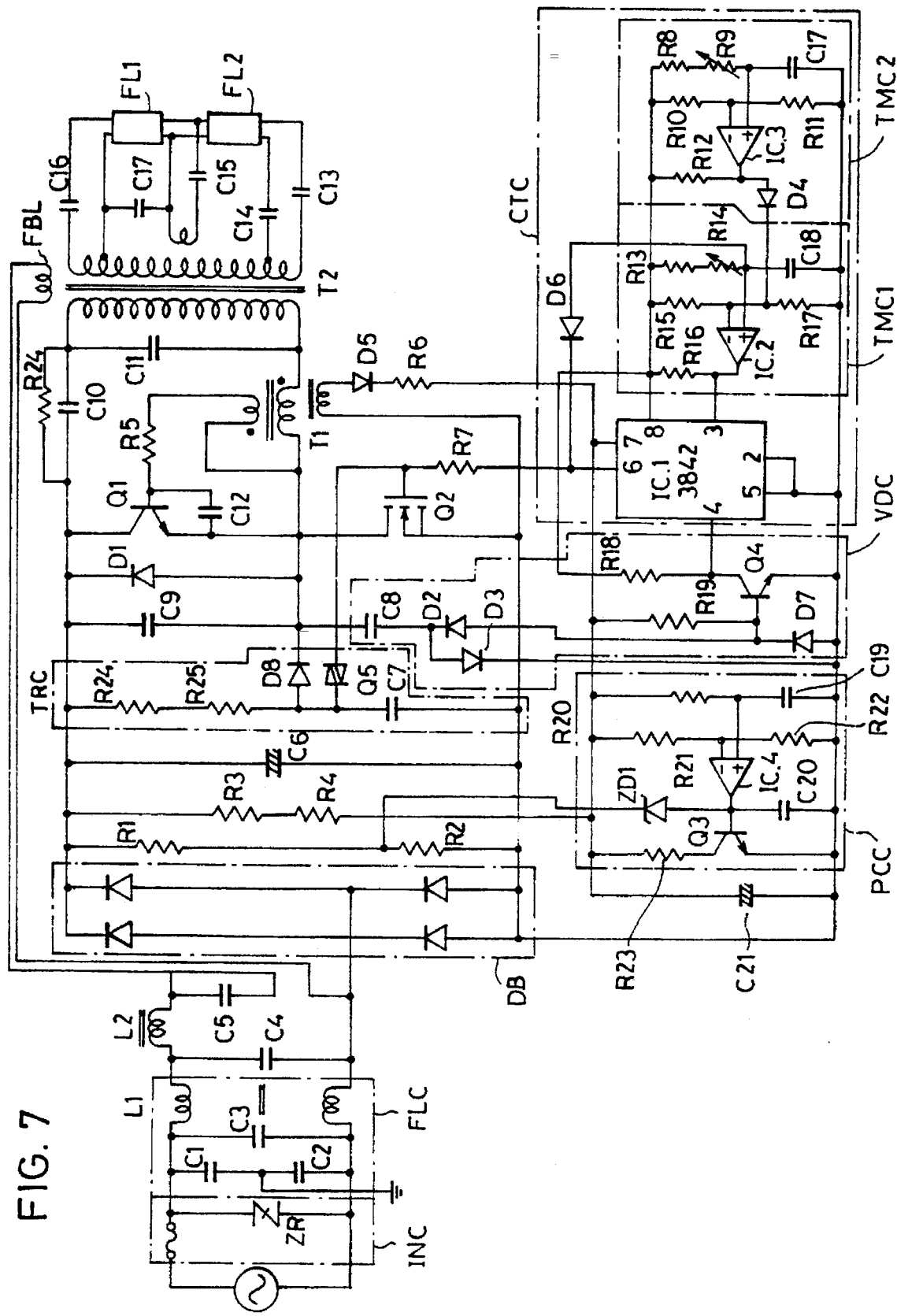
FIG. 7 is a more detailed circuit diagram of the device shown in FIG. 6.

FIG. 7 shows the power source device of FIG. 6 in a more detailed circuit diagram, in which an IC/UC 3842 manufactured by a U.S. firm, UNITRODE, is employed as the drive control circuit together with first and second timer circuits TMC1 and TMC2, so that the detection signal of the detection circuit VDC in respect of the potential at intermediate point between the switching transistors Q1 and Q2 is input to No. 4 terminal of the IC/UC 3842 and is output from No. 6 terminal of the IC/UC 3842 after a period set by the first timer circuit TMC1. At the second timer circuit TMC2, an output waveform of the first timer circuit TMC1 is narrowed in ON width for a certain period, for example, 1 second, from the time of power-source connection, so that the output of the inverter circuit will be subjected to a restrictive actuation upon the power-source connection, and the filaments of the discharge lamps FL1 and FL2 can be effectively preheated. Further, in FIG. 7, an input protection circuit INC is connected to the AC source 11 at a front stage of the filter circuit FLC, a starting circuit TRC is connected between the diode bridge DB and the inverter circuit, and a protection control circuit PCC is inserted on the opposite side of the detection circuit VDC with respect to the drive control circuit CTC including the first and second timer circuits TMC1 and TMC2.

Also in the power source device shown in FIGS. 6 and 7, a pausing period in the input current is restrained, to reduce the switching loss or the high frequency noise due to the switching of the high voltage of the diode employed in the feedback circuit, to simplify the circuit arrangement, and to improve the input power factor as well as the performance in respect of the higher harmonic distortion, in the same manner as in the foregoing embodiments.

Figure 8:
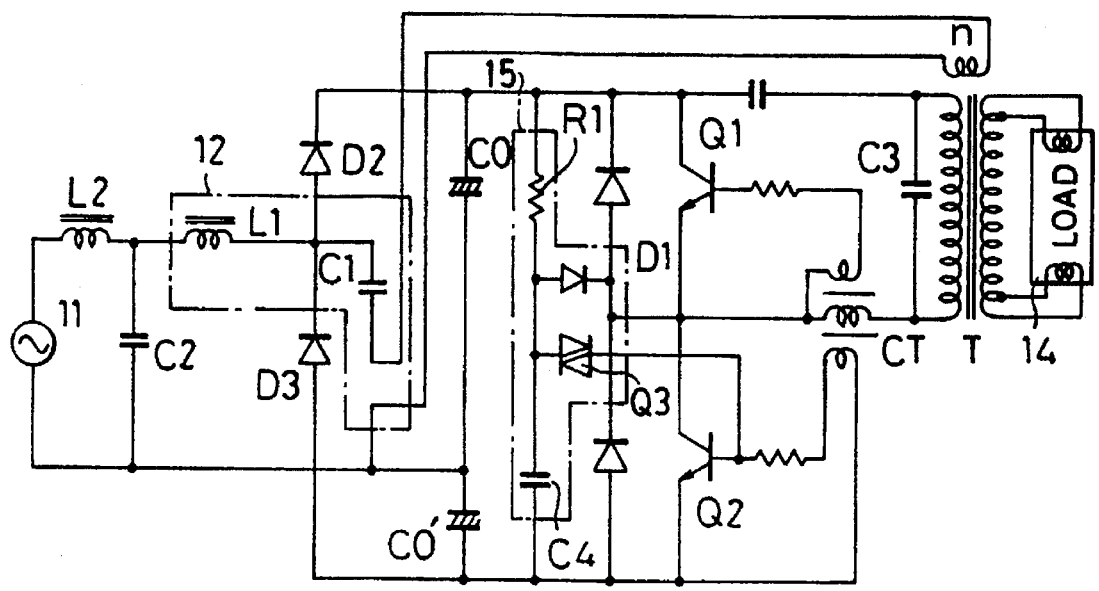
FIG. 8 is a circuit diagram of the power source device in another embodiment according to the present invention.
Figure 9:
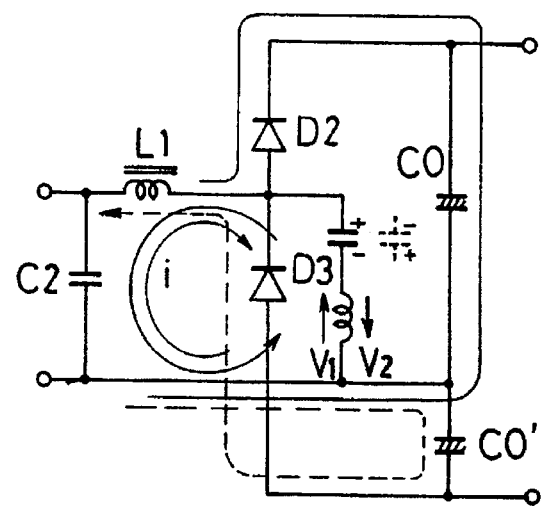
FIG. 9 is a fragmentary explanatory view for the operation of the device in the embodiment of FIG. 8.

In FIG. 8, there is shown another embodiment of the power source device according to the present invention, in which a voltage doubler circuit is employed in place of the diode bridge DB in the foregoing embodiments as the rectifying means. The voltage doubler includes diodes D2 and D3 connected in series. The feedback winding of the voltage feedback means is connected, through a capacitor C1 that is also part of the voltage feedback means, in parallel with the diode D3 of the voltage doubler. In this case, as will be clear when compared with the embodiment shown in FIG. 1, the inverter circuit is formed in the same arrangement to realize the same operation. Also with respect to the voltage superposition, as will be clear when FIG. 9 is concurrently referred to, the resonance current $i$ is caused to flow to the resonance circuit by the high frequency AC voltage generated in the feedback winding $\underline{n}$. Accordingly, in the positive half cycle of the voltage across the capacitor C1 and the high frequency AC voltage in the feedback winding $\underline{n}$, the diode D2 is conducting to charge the smoothing capacitor C0 and, in the negative half cycle, the diode D3 is conducting to charge another capacitor C0'. The capacitance C0' is connected in series with the smoothing capacitor C0. The series connection of the smoothing capacitor C0 and the additional capacitors C0' is connected in parallel with the series connection of the diodes D2 and D3 of the voltage doubler.

Figure 10:
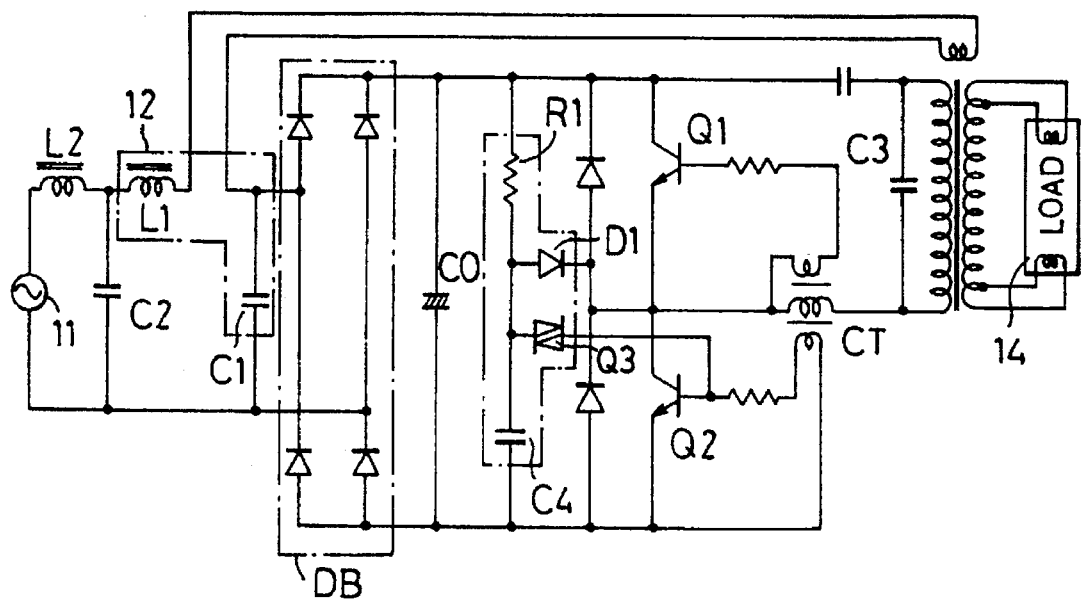
FIG. 10 is a circuit diagram showing the power source device in another embodiment according to the present invention.

In FIG. 10, there is shown still another embodiment of the power source device according to the present invention, in which the inverter circuit is formed in the same arrangement as that in the embodiment of FIG. 1, to have the same operation realized. In the present embodiment, the feedback winding $\underline{n}$ from the inverter circuit is connected in series with the inductor L1 of the resonance circuit 12, so that the high frequency AC voltage in the feedback winding $\underline{n}$ executes the resonance operation with the inductor L1 and capacitor C1 with respect to the AC source 11 to cause the resonance current to flow in a closed circuit of the capacitor C1—inductor L1—feedback winding $\underline{n}$—capacitor C2. With this resonance current, a high frequency voltage is generated across the capacitor C1, which voltage rises to exceed a charged voltage in the smoothing capacitor C0, upon which the diode bridge DB conducts to cause a charging current (high frequency chopping current) to flow to the capacitor C0, this chopping current allows substantially the same input current waveform as the AC voltage through the inductor L2 provided as the filter means, and the same advantages as in the foregoing embodiments can be realized.

Figure 11:
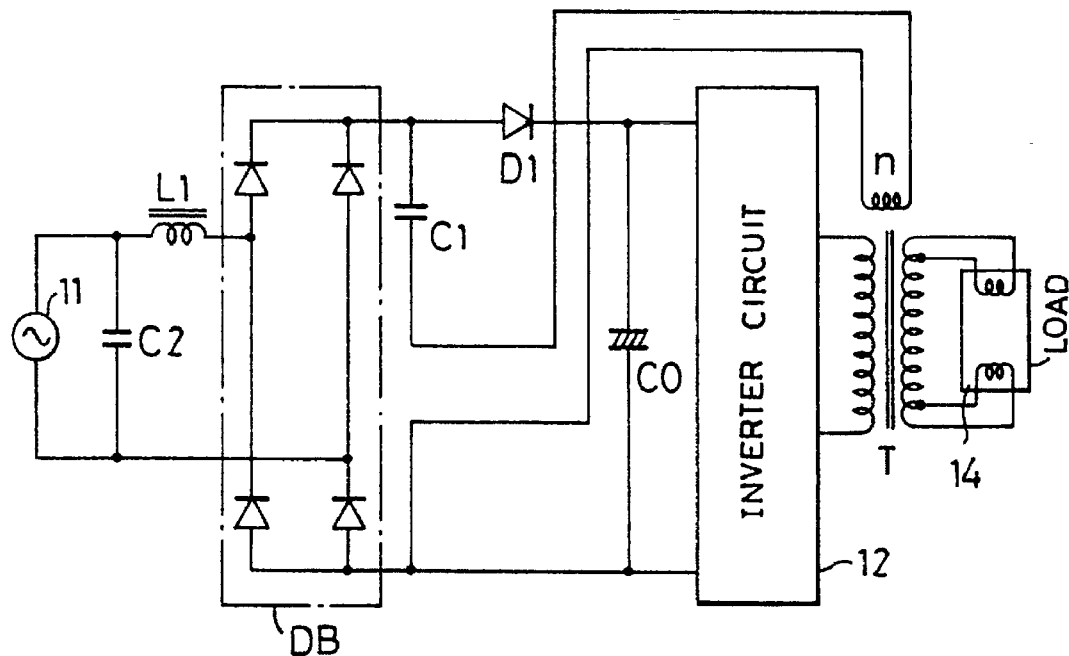
FIG. 11 is a circuit diagram showing the power source device in still another embodiment according to the present invention.
Figure 12A:
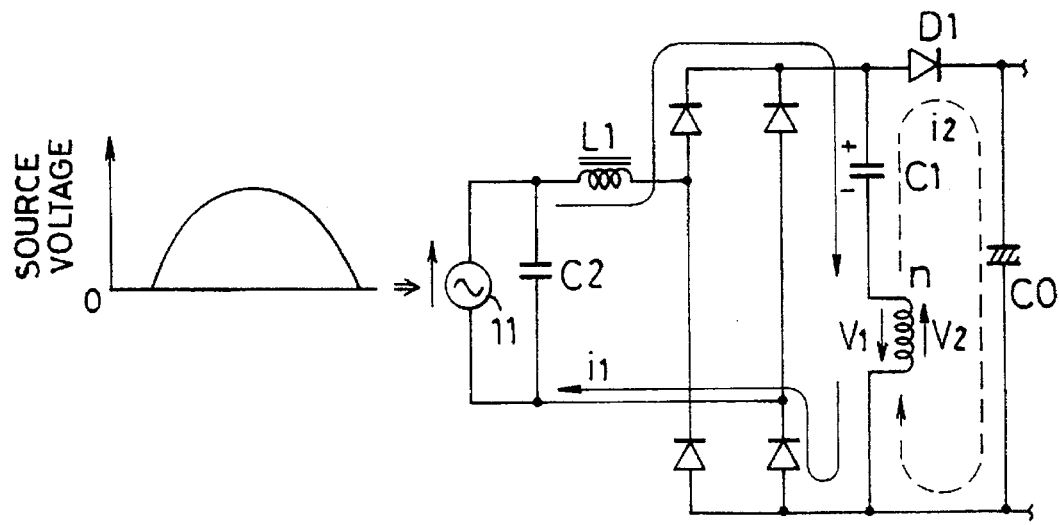
FIGS. 12A and 12B are explanatory views for the operation of the device in the embodiment of FIG. 11 respectively upon each of different half waves of the AC source voltage.

In FIG. 11, there is shown another embodiment of the power source device according to the present invention, in which, in place of the inductor L2 employed in the embodiment of FIG. 1, the diode D1 as a rectifying element is connected to an input side of the smoothing capacitor C0, and the smoothing capacitor C0 will be charged through this diode D1 by an output voltage of the diode bridge DB on which the high frequency AC voltage is superposed. In this case, as shown in FIG. 12A where the AC voltage of the AC source 11 is in the positive half cycle, there is generated in the feedback winding $\underline{n}$ connected to the output side of the diode bridge DB the high frequency AC voltage responsive to an operating frequency of the inverter circuit 12. In the event where this high frequency AC voltage is generated in the direction of arrow $v_1$ in FIG. 12A, the capacitor C1 is charged with the input current $i_1$ from the AC source 11 due to the resonance of the capacitor C1 and inductor L1. In the event where, opposite to the above, the direction of the high frequency AC voltage induced in the feedback winding $\underline{f}$ is reversed to be as shown by an arrow $v_2$, the diode D1 conducting at the time when the voltage across the capacitor C1 and the high frequency AC voltage in the feedback winding $\underline{n}$ rise to be higher than the voltage across the smoothing capacitor C0, the charge current $i_2$ is caused to flow through the smoothing capacitor C0 by the discharge of the capacitor C1 and the high frequency AC voltage in the direction of $v_2$, and the smoothing capacitor C0 is thereby charged. In this case, the input current $i_1$ flows from the AC source 11 to the capacitor C1 to supplement the charge in the capacitor C1 which has been reduced by the discharge.

Figure 12B:
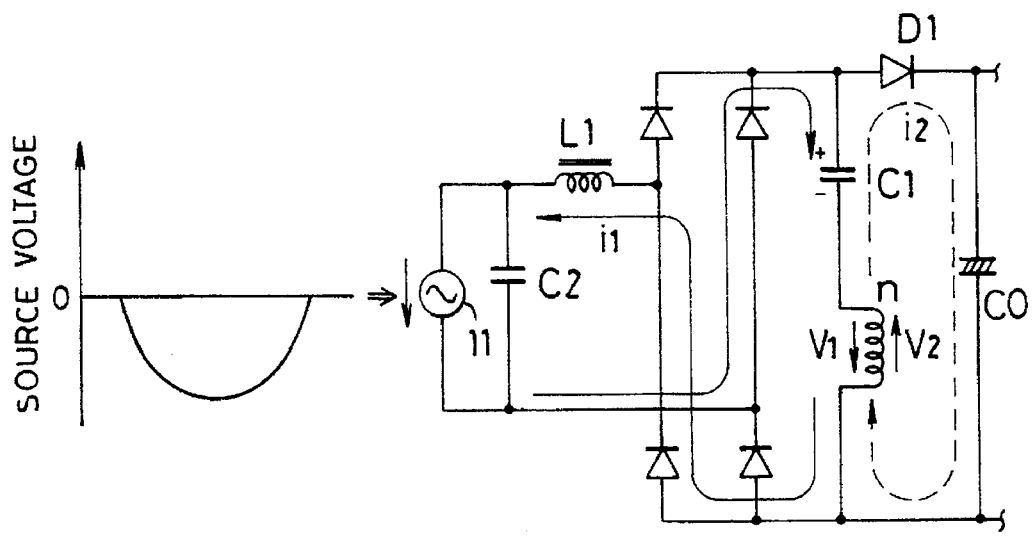

Next, as shown in FIG. 12B where the AC voltage from the AC source 11 is in the negative half cycle and the high frequency AC voltage in the feedback winding $\underline{n}$ is in the direction of $v_1$, the capacitor C1 is charged by the input current $i_1$ from the AC source 11 due to the resonance operation of the capacitor C1 and inductor L2. In the event where the direction of the high frequency AC voltage in the feedback winding $\underline{n}$ is reversed to be along the arrow $v_2$ opposite to the above, the diode D1 conducts due to by the voltage across the capacitor C1 and the high frequency AC voltage in the feedback winding $\underline{n}$, the charge current $i_2$ flows through the smoothing capacitor C0 by the discharge of the capacitor C1 and the high frequency AC voltage $v_2$, and the smoothing capacitor C0 is thereby charged. At this time, the input current $i_1$ flows from the AC source 11 to the capacitor C1 so as to supplement the charge therein which has been reduced by the discharge.

Figure 13:
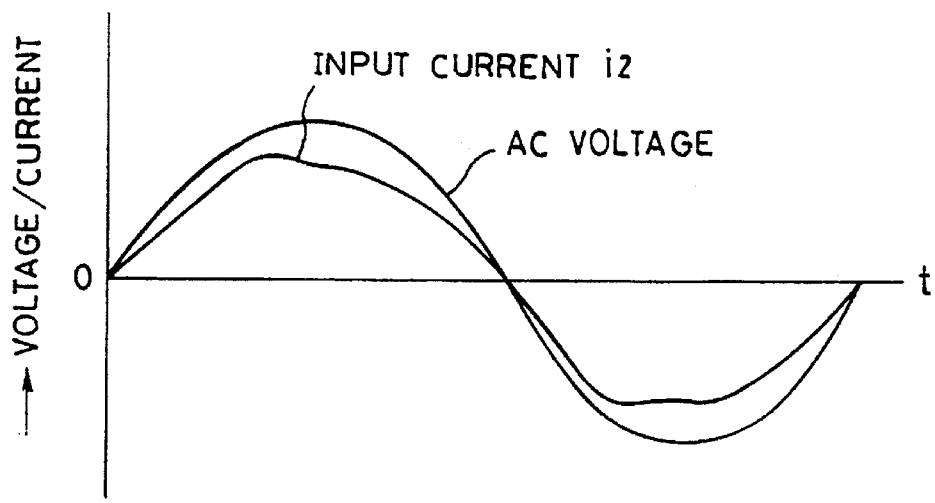
FIG. 13 shows in a waveform diagram both of AC voltage and input current in the device shown in FIG. 11.

As has been described, the chargings of the capacitor C1 and smoothing capacitor C0 are alternately carried out at every half cycle of the high frequency AC voltage generated in the feedback winding $\underline{n}$ so that the input current $i_1$ will flow substantially in all ranges of each cycle of the AC voltage from the AC source 11 as shown in FIG. 13, and a pausing period can be prevented in the input current.

Figure 14:
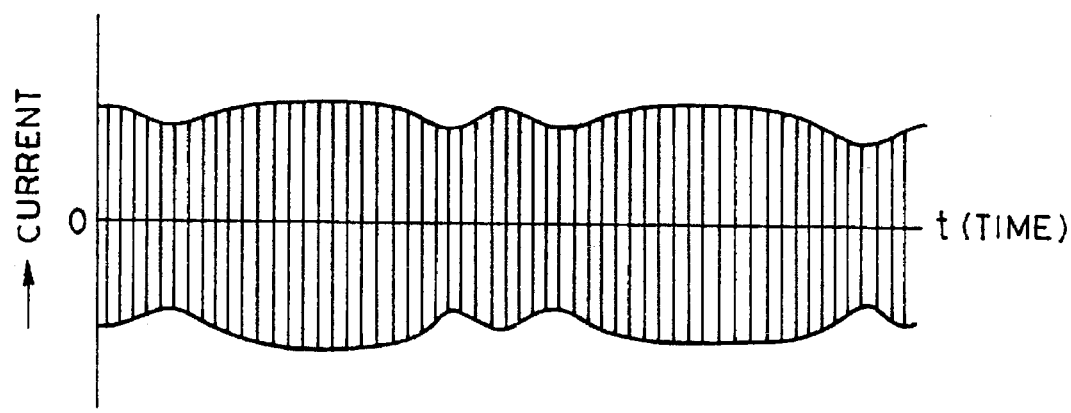
FIG. 14 is a waveform diagram showing the lamp current occurring in the device of FIG. 11.

Further, in the event where a discharge lamp is employed in the present embodiment as the load 14, as the lamp current is prevented from falling to be closer to zero as seen in FIG. 14, substantially as in FIG. 4, the ripple is optimumly restrained, and the optical output in lumen/watt of the discharge lamp can be maintained at an excellent level.

Figure 15:
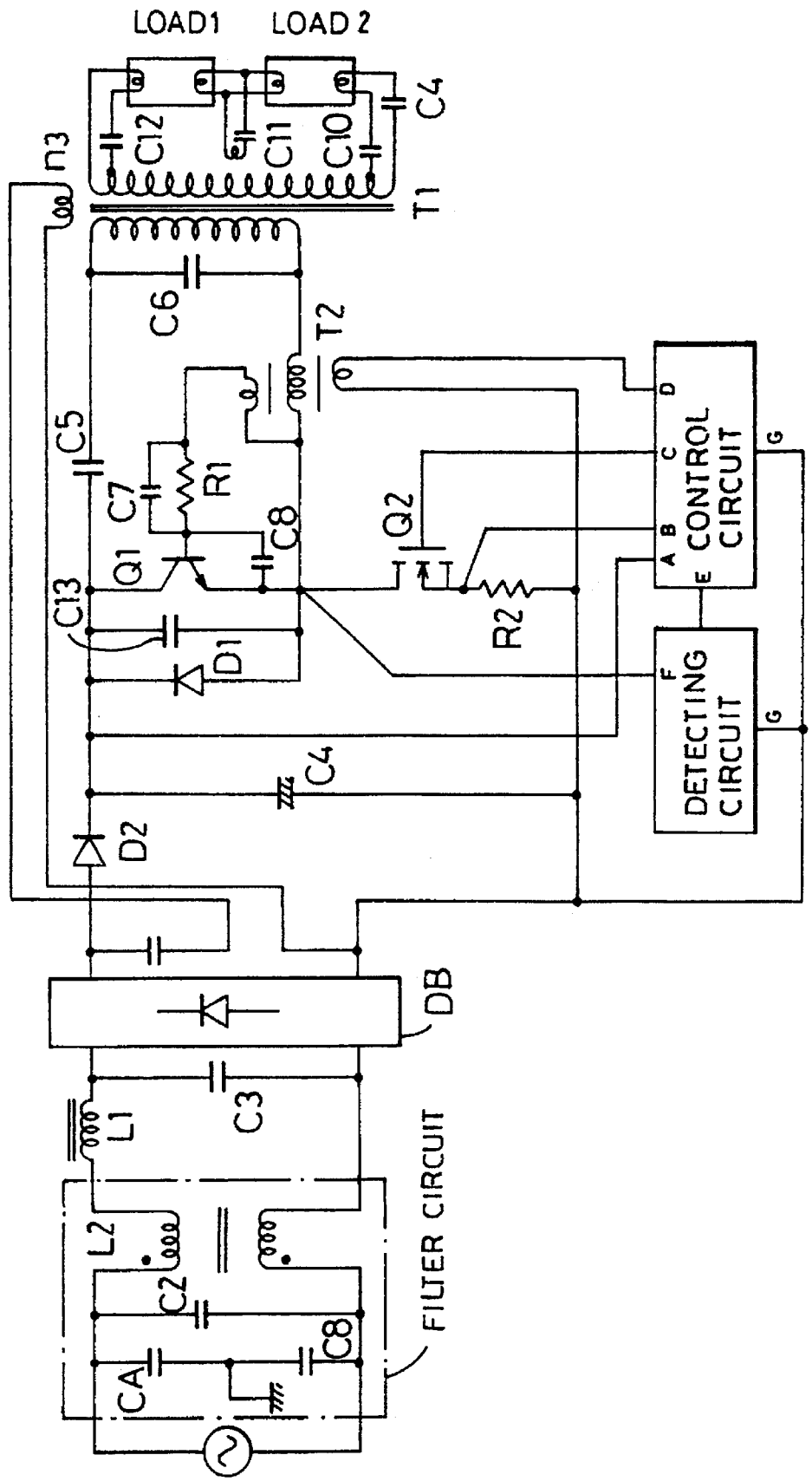
FIG. 15 is a circuit diagram showing the power source device in another embodiment according to the present invention.

In still another embodiment shown in FIG. 15 of the power source device according to the present invention, the same inverter circuit arrangement as that of the embodiment shown in FIGS. 6 and 7 is adopted, and the same superposing circuit as that employed in the embodiment of FIG. 11 is utilized, whereby the same function and effect as in the foregoing embodiments are realized.

Figure 16:
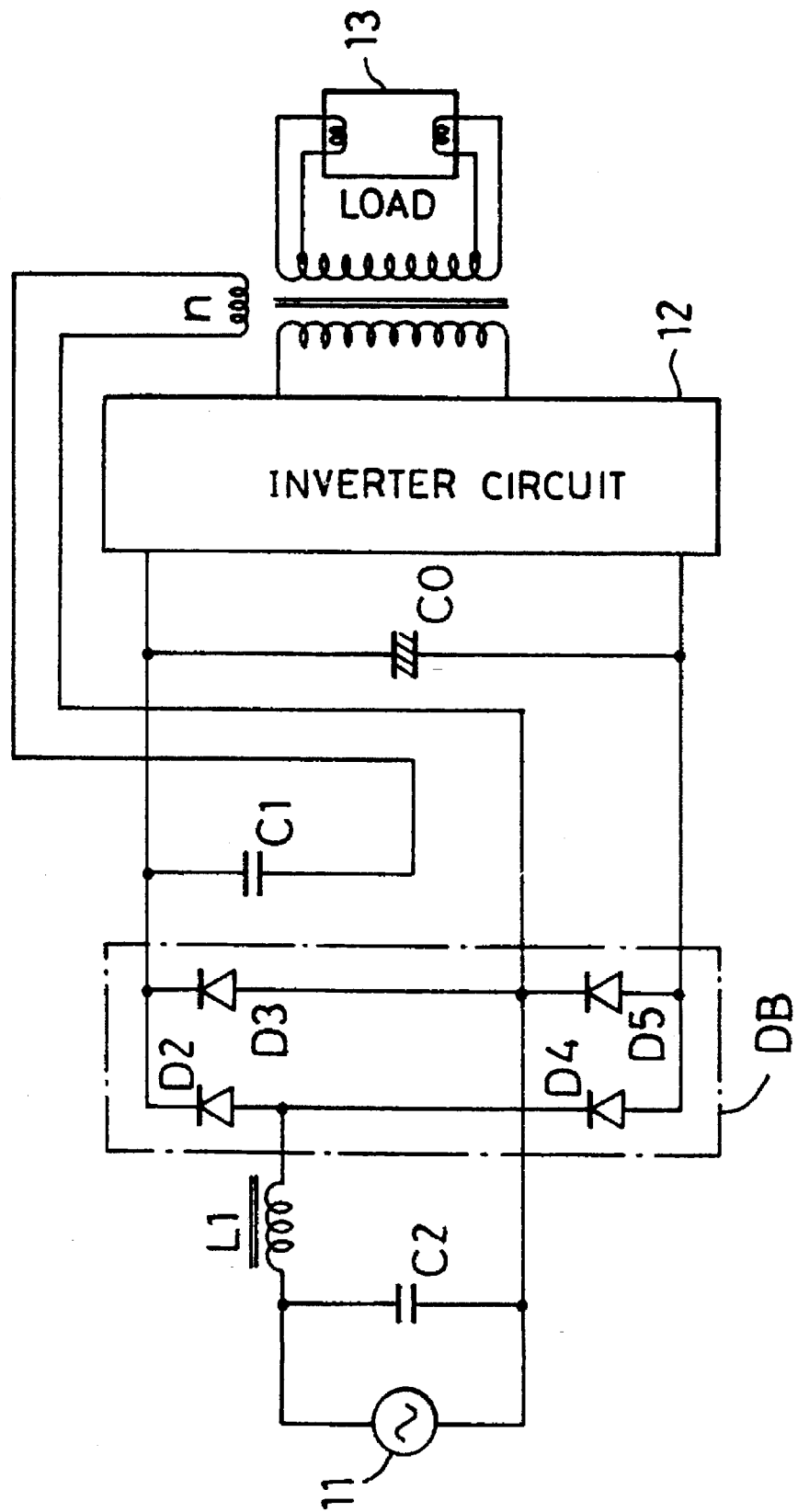
FIG. 16 is a circuit diagram showing the power source device in still another embodiment according to the present invention.

Referring to FIG. 16, there is shown another embodiment of the power source device according to the present invention, in which the feedback winding $\underline{n}$ from the inverter circuit 12 is connected in parallel to one diode D3 in the diode bridge DB, in place of the diode D1 as the rectifying element connected to the input side of the smoothing capacitor C0 employed in the embodiment of FIG. 15, upon which the function of the diode D1 in the embodiment of FIG. 15 is to be performed by one diode D5 in the elements of the diode bridge DB in the present embodiment.

Figure 17A:
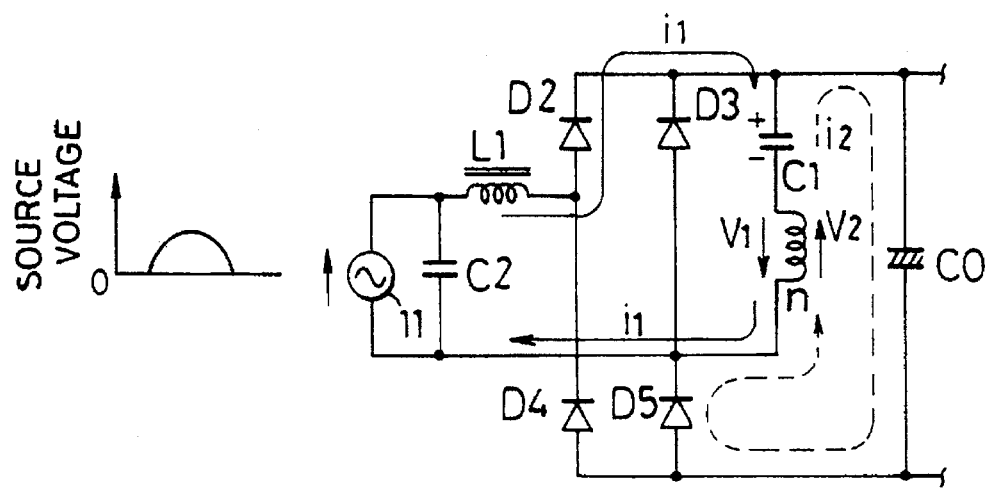
FIGS. 17A and 17B are explanatory views for the operation of the device in the embodiment of FIG. 16 respectively upon each of different half waves of the AC source voltage.
Figure 17B:
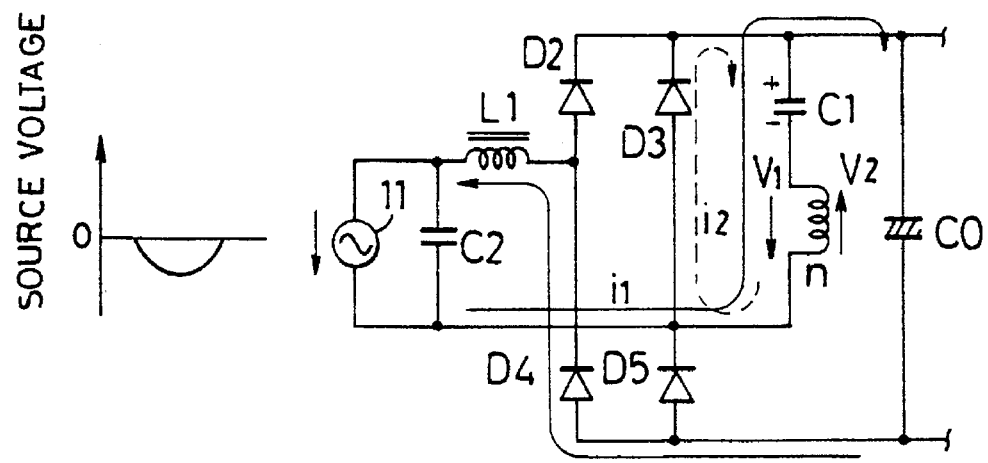

By references to FIGS. 17A and 17B, the operation of the embodiment of FIG. 16 shall be explained. Now, as the AC voltage of the AC source 11 is in the positive half cycle as shown in FIG. 17A, the high frequency AC voltage is being produced in the feedback winding $\underline{n}$ in accordance with the operating frequency of the inverter circuit 12, and, when this high frequency AC voltage produced is in the direction of arrow $v_1$, the capacitor C1 is charged by the input current $i_1$ from the AC source 11. When the high frequency AC voltage in the feedback winding $\underline{n}$ is reversed to be in the opposite direction of the arrow $v_2$, the AC voltage of the AC source 11, the voltage across the capacitor C1 and the high frequency AC voltage $v_2$ in the feedback winding $\underline{n}$ which is elevated to be higher than the voltage across the smoothing capacitor C0 cause the diode D5 to conduct, and the charging current $i_2$ flows by the discharge of the capacitor C1 and the high frequency AC voltage $v_2$, and the smoothing capacitor C0 is thereby charged.

Then, as the AC voltage of the AC source 11 alters to the negative half cycle as shown in FIG. 17B, the diode D3 conducts if the high frequency AC voltage in the direction of arrow $v_1$ in the feedback winding $\underline{n}$ is higher than the AC voltage of the AC source 11, and the capacitor C1 is charged by the input current $i_2$ from the AC source 11 due to the resonance of the capacitor C1 and inductor L1. When the high frequency AC voltage in the feedback winding $\underline{n}$ is reversed to be in the direction of arrow $v_2$, the diode D4 conducts when the voltage across the capacitor C1, the high frequency AC voltage $v_2$ and the AC voltage of the AC source 11 exceed the both-end voltage across the smoothing capacitor C0, to cause the charging current $i_1$ to flow to charge the smoothing capacitor C0.

As described above, the smoothing capacitor C0 is charged with the input currents $i_1$, $i_2$ from the AC source 11, and the input currents $i_1$, $i_2$ are caused to flow substantially over the whole range of each cycle of the AC voltage of the AC source 11 as shown in FIG. 13, so that a pausing period can be prevented in the input current.

While in the embodiment of FIG. 16 the feedback winding is referred to as being connected in parallel to the one diode D3 in the diode bridge DB, it is possible to attain the same function even when the winding is connected in parallel to any one of other diodes D2, D4 and D5. Further, the resonating inductor L1 shown to be inserted at next stage to the AC source 11 in FIG. 16 may be inserted at a proper position in the closed circuit of the AC source 11 and the capacitor C1.

Further, all other arrangements and functions besides those described above with reference to FIGS. 5, 6 and 7 as well as FIGS. 8, 10, 11, 15 and 16 are the same as those in the embodiment of FIG. 1, and the same functions and effect can be realized.

What is claimed is:

1. A power source device comprising:
   an AC source for supplying an AC voltage;
   rectifying means including at least one diode element for rectifying the AC voltage;
   a first smoothing capacitor for smoothing an output voltage from said rectifying means to produce an output DC voltage;
   inverter means for converting the output DC voltage into a high frequency AC voltage and for supplying the high frequency AC voltage to a load;
   voltage feedback means for feeding the high frequency AC voltage back to an input side of said rectifying means;
   resonating means including a resonating capacitor and a resonating inductance element for resonating at the high frequency AC voltage; and
   a diode element connected in a forward direction between said voltage feedback means and said first smoothing capacitor.

2. The device according to claim 1, wherein said voltage feedback means is connected in parallel with said rectifying means.

3. A power source device comprising:
   rectifying means including at least one diode element for rectifying the AC voltage;
   a first smoothing capacitor for smoothing an output voltage from said rectifying means to produce an output DC voltage;
   inverter means for converting the output DC voltage into a high frequency AC voltage and for supplying the high frequency AC voltage to a load;
   voltage feedback means for feeding the high frequency AC voltage back to a DC output side of said rectifying means;
   resonating means including a resonating capacitor and a resonating inductance element for resonating at the high frequency AC voltage; and
   a diode element connected in a forward direction between said voltage feedback means and said first smoothing capacitor.

4. A power source device comprising:
   an AC source for supplying an AC voltage;
   rectifying means including at least one diode element for rectifying the AC voltage;
   a smoothing capacitor for smoothing an output voltage from said rectifying means to produce an output DC voltage;
   a series circuit including first and second switching elements, said series circuit of said first and second switching elements being connected in parallel with said smoothing capacitor;
   a load circuit connected, through a DC blocking capacitor, in parallel with at least one of said first and second switching elements;
   inverter means, including a control section for controlling switching of said first and second switching elements, for converting the output DC voltage into a high frequency AC voltage;
   voltage feedback means for feeding the high frequency AC voltage from said inverter means back to an input side of said rectifying means and connected in parallel with said rectifying means;
   resonating means including a resonating capacitor and a resonating inductance element for resonating with the high frequency AC voltage; and
   a diode element connected in a forward direction between said voltage feedback means and said smoothing capacitor.

5. A power source device comprising:
   an AC source for supplying an AC voltage;
   rectifying means including at least one diode element for rectifying the AC voltage;
   a smoothing capacitor for smoothing an output voltage from said rectifying means to produce an output DC voltage;
   inverter means for converting the DC output voltage into a high frequency AC voltage, said inverter means including:
      first and second series-connected switching elements connected in series, said smoothing capacitor being connected in parallel with said series-connected first and second switching elements; and
      third and fourth series-connected switching elements connected in series, said smoothing capacitor being connected in parallel with said series-connected third and fourth switching elements;
   a load circuit connected between (i) a junction of said first and third switching elements and (ii) a junction of said third and fourth switching elements;

voltage feedback means for feeding the high frequency AC voltage back to an input side of said rectifying means and connected in parallel with said rectifying means;

resonating means including a resonating capacitor and a resonating inductance element for resonating with the high frequency AC voltage; and a diode element connected in a forward direction between said voltage feedback means and said smoothing capacitor.

6. The device according to claim 1, wherein said rectifying means comprises first and second diode elements connected in series, and a second smoothing capacitor connected in series with said first smoothing capacitor, said AC source being connected between (i) a junction of said first and second diode elements and (ii) a junction of said first and second smoothing capacitors.

7. A power source device comprising:

an AC source for supplying an AC voltage;

first and second series-connected diodes connected in series;

first and second series-connected smoothing capacitors connected in series, said first and second series connected smoothing capacitors being connected in parallel with said first and second series-connected diodes;

first and second series-connected switching elements, said first and second series-connected switching elements being connected in parallel with said first and second series-connected smoothing capacitors;

a load circuit connected, through a DC blocking capacitor, in parallel with at least one of said first and second switching elements;

self-excitation starting means for applying a starting signal to one of said first and second switching elements;

self-excitation control means for controlling switching of said first and second switching elements in response to change signals from said load circuit fed back to control terminals of said first and second switching elements for generating and applying a high frequency AC voltage to said load circuit;

voltage feedback means for feeding the high frequency AC voltage back to said first and second series-connected diodes, one of said first and second series-connected diodes being connected in parallel with said voltage feedback means;

resonating means including a resonating capacitor and a resonating inductance element for resonating with the high frequency AC voltage; and a diode element connected in a forward direction between said voltage feedback means and said smoothing capacitor, said AC source being connected in parallel with one of said first and second series-connected diodes.

8. The device according to claim 4, wherein said rectifying means comprises a bridge circuit of diode elements, and said voltage feedback means is connected to feed the high frequency AC voltage through one of said diode elements of said rectifying means to a DC output side of said rectifying means.

9. The device according to claim 4, wherein said load circuit includes a series circuit of a resonating capacitor and a resonating inductance element.

10. The device according to claim 4, wherein said load circuit includes a discharge lamp as a load.

11. The device according to claim 4, wherein said resonating means includes a secondary winding, and said control means further comprises self-excitation control means for switching said first and second switching elements in response to change signals from said load circuit fed back to control terminals of said first and second switching elements and for applying the high frequency AC voltage to said load circuit.

12. The device according to claim 4, wherein said load circuit includes a second resonating capacitor and a transformer having primary and secondary windings, said primary winding being connected in parallel with said second resonating capacitor, and including a discharge lamp connected as a load in parallel with said secondary winding.

13. The device according to claim 12, wherein said control means comprises self-excitation control means for switching said first and second switching elements in response to change signals in said discharge lamp fed back to control terminals of said first and second switching elements and for applying the high frequency AC voltage to said load circuit.

14. The device according to claim 7, wherein said self-excitation control means includes a saturable transformer.

15. The device according to claim 7, wherein said self-excitation starting means includes a resistor and a capacitor connected in series, said resistor and capacitor connected in series being connected in parallel with said rectifying means, and a DIAC connected between (i) a junction of said resistor and said capacitor of said self-excitation starting means and (ii) a control terminal of said second switching element.

16. The device according to claim 1, wherein said inverter means is self-excited.

17. The device according to claim 1, wherein said inverter means is externally-excited.

18. The device according to claim 1, wherein said resonating means couples said voltage feedback means to said rectifying means.

19. The device according to claim 4, wherein said resonating means couples said voltage feedback means to said rectifying means.

20. The device according to claim 5, wherein said resonating means couples said voltage feedback means to said rectifying means.

21. The device according to claim 7, wherein said resonating means couples said voltage feedback means to said rectifying means.

* * * * *